(12) United States Patent
Smith

(10) Patent No.: US 7,134,545 B1
(45) Date of Patent: Nov. 14, 2006

(54) CONVEYOR APPARATUS AND SYSTEM

(76) Inventor: Chris Smith, 11936 W. 119th St., Box 313, Overland Park, KS (US) 66213-2216

( * ) Notice: Subject to any disclaimer, the term of this patent is extended or adjusted under 35 U.S.C. 154(b) by 0 days.

(21) Appl. No.: 11/355,579

(22) Filed: Feb. 16, 2006

(51) Int. Cl.
B65G 23/06 (2006.01)
B65G 17/00 (2006.01)
B65G 21/20 (2006.01)
B65G 17/06 (2006.01)

(52) U.S. Cl. .................. 198/834; 198/844.1; 198/850; 198/851; 198/852; 198/853

(58) Field of Classification Search ............... 198/834, 198/844.1, 850, 851, 852, 853
See application file for complete search history.

(56) References Cited

U.S. PATENT DOCUMENTS

| | | |
|---|---|---|
| 3,602,364 A | 8/1971 | Maglio et al. |
| 4,072,062 A | 2/1978 | Morling et al. |
| 4,080,842 A | 3/1978 | Lapeyre et al. |
| 4,213,527 A | 7/1980 | Lapeyre et al. |
| 4,556,142 A | 12/1985 | Lapeyre |
| 4,688,670 A * | 8/1987 | Lapeyre ................. 198/853 |
| 4,729,469 A | 3/1988 | Lapeyre et al. |
| 4,925,016 A | 5/1990 | Lapeyre |
| 4,993,543 A * | 2/1991 | Lapeyre ................. 198/834 |
| 6,423,279 B1 | 7/2002 | Warren |

* cited by examiner

Primary Examiner—Gene O. Crawford
Assistant Examiner—Leslie A. Nicholson, III
(74) Attorney, Agent, or Firm—Storm LLP; John G. Fischer

(57) ABSTRACT

In the meat processing industry, maintaining a clean and efficient environment can be important. Over the years, modular conveyor belts have become a commonplace component of meat processing operations. To provide an efficient and long lasting conveyor system, sprocket driven modules are provided with improved configurations which result in improved belt tracking and reduce incidents of mechanical failure. Specifically, these improvements include a conveyor module having a central drive bar having alternating crest pairs and troughs along its top, connected by shoulders that enable improved driving and tracking while being structurally strong and easy to clean.

15 Claims, 6 Drawing Sheets

CONVEYOR APPARATUS AND SYSTEM

TECHNICAL FIELD OF INVENTION

The invention relates generally to a conveyor system, and, more particularly, to a meat transporting conveyor system.

BACKGROUND OF THE INVENTION

In the meat and meat packing industries, conveyor belts and conveyor systems are commonly utilized to transport meat in processing plants.

The most frequently employed conveyor systems comprise a number of interlocking conveyor modules linked together to form a continuous conveyor belt, which is driven by a sprocket. Some examples of these types of conveyor systems are U.S. Pat. Nos. 4,925,016, 6,423,279, 3,602,364, 4,072,062, 4,080,842, 4,213,527, and 4,556,142. Some systems both drive the belt and track the belt with the sprockets. Many of these devices, however, either lack adequate drive surfaces on the belt or provide inadequate tracking, allowing the belt to wander.

Therefore, there is a need for a conveyor system that addresses at least some of the problems associated with the conventional systems. In particular, a conveyor system is needed that is easy to drive, without fear of frequent failure, or disengagement between the sprocket and conveyor belt.

SUMMARY OF THE INVENTION

Advantages of the various embodiments of the present invention are that it is simple, safe, and durable. Another advantage of the present invention is that it is inexpensive to manufacture. Another advantage of the present invention is that it provides for a simplified, easily deployable, and easily removable system. Other advantages of the various embodiments of the present invention is that it is easy to clean and provides improved tracking.

In accordance with a preferred embodiment of the present invention, a conveyor belt cleaning system is provided. A plurality of conveyor modules are pivotally secured to one another. Each conveyor module includes a planar member having a first edge, an opposing second edge, a top surface, and a bottom surface.

Also in accordance with the above-mentioned preferred embodiments are several features extending from the planar member. A plurality of first links are located along the first edge, and a plurality of second links are located along the second edge. The first and second links form eyelets. The second links are adapted to engage and coaxially align with the first links so as to form a pivot joint between each conveyor module.

Also in accordance with the above-mentioned preferred embodiments are additional features extending from the planar member. A drive bar is also included which extends perpendicular from the bottom surface and is substantially parallel to the first and second edges. The drive bar includes a drive face and a plurality of crest pairs with a trough therebetween connected by a pair of shoulders. In the preferred embodiment, the shoulders are nonplaner.

In the preferred embodiment the shoulders in a trough extend towards each other. In another preferred embodiment, opposing shoulders converge at the trough such that distance between the shoulders at the crest pairs is greater than the distance between the shoulders at the trough. A driving force from a sprocket may be applied across at least a portion of the drive face. Each pair of shoulders is adapted to engage a tracking tooth of a sprocket.

In another preferred embodiment of the present invention, each shoulder further comprises a pair of intersecting planar members. In an alternative embodiment of the present invention, each shoulder further comprises a curvilinear surface.

In another preferred embodiment of the present invention, the curvilinear surface is a spheroid section. In another preferred embodiment of the present invention, the curvilinear surface is a prolate spheroid section.

In another preferred embodiment of the present invention, a conveyor system is provided. Within the conveyor system is a sprocket and a conveyor belt formed of a plurality of interlocked conveyor modules pivotally secured to one another. The sprocket includes a plurality of generally semicircular recesses and a tracking tooth located between each recess member. Each recess member includes a driving member at each end.

Within the conveyor belt, a plurality of conveyor modules are pivotally secured to one another. Each conveyor module includes a planar member having a first edge, an opposing second edge, a top surface, and a bottom surface. A plurality of first links are located along the first edge, and a plurality of second links are located along the second edge. The second links are adapted to engage and coaxially align with the first links so as to form a pivot joint between each conveyor module.

Also in accordance with the above-mentioned preferred embodiments are additional features extending from the planar member. A drive bar is also included which extends perpendicular from the bottom surface and is substantially parallel to the first and second edges. The drive bar includes a drive face and a plurality of crest pairs with a trough therebetween connected by a pair of shoulders. In the preferred embodiment, the shoulders are nonplaner.

In another preferred embodiment, the shoulders in a trough extend towards each other. In another preferred embodiment, opposing shoulders converge at the trough such that distance between the shoulders at the crest pairs is greater than the distance between the shoulders at the trough. A driving force from a sprocket may be applied across at least a portion of the drive face. Each pair of shoulders is adapted to engage a tracking tooth of a sprocket. In an alternate embodiment of the present invention, each tracking tooth is adapted to form a complementary fit with the shoulders.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 4:
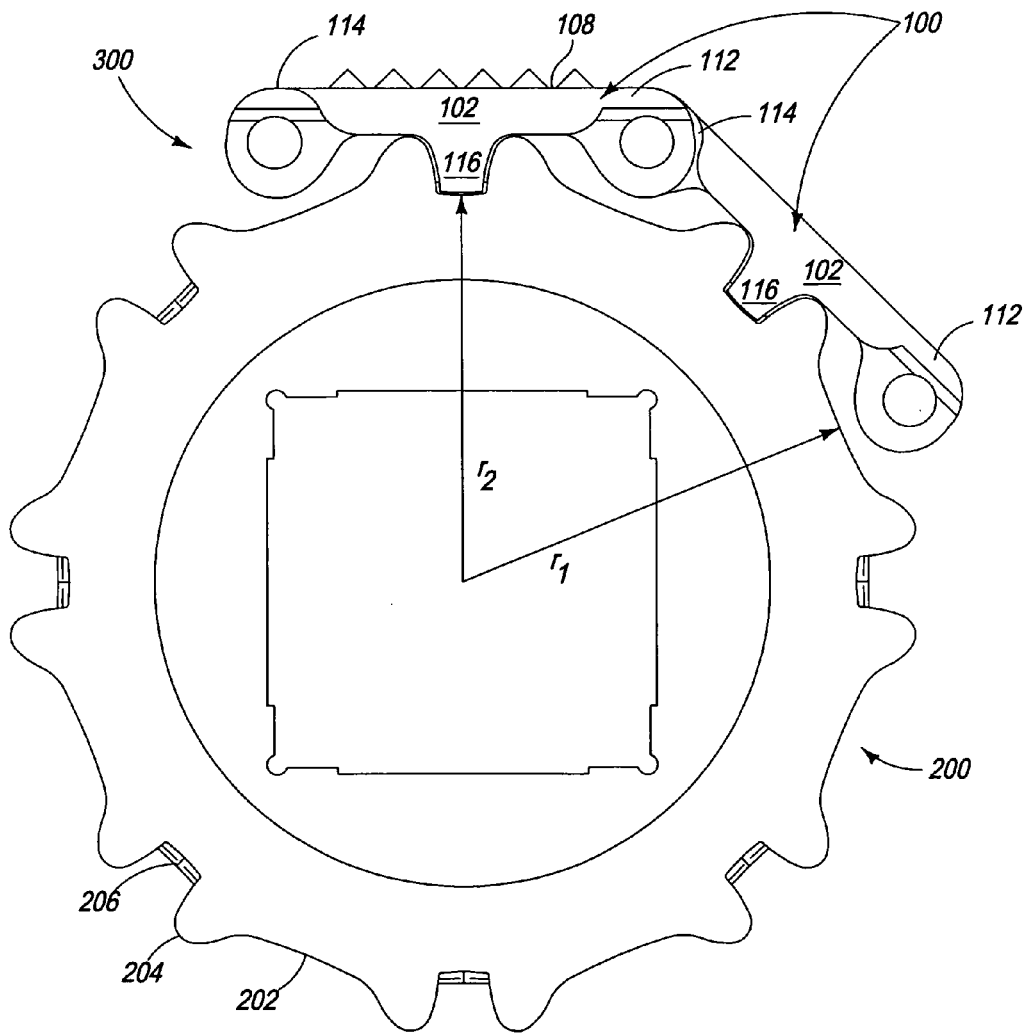
FIG. 4 is an elevation view of the conveyor system of FIGS. 1–3.
Figure 8:
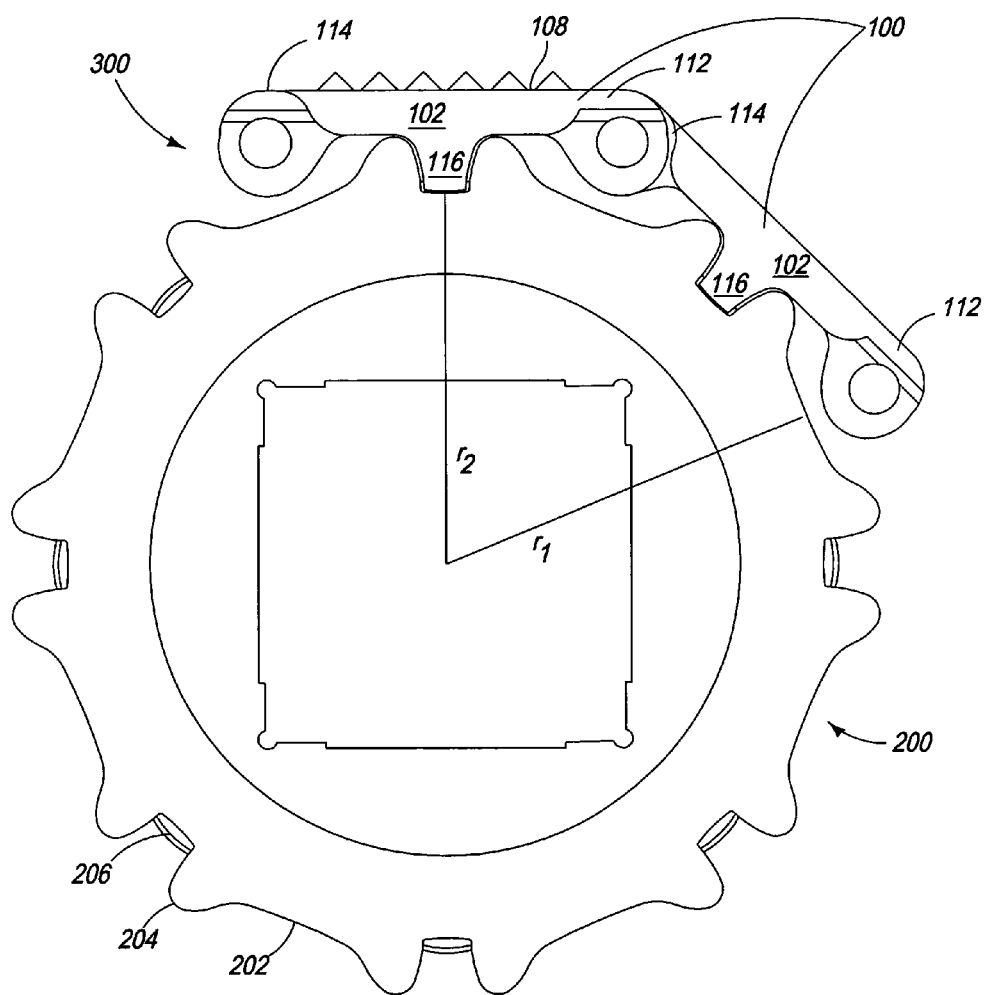
FIG. 8 is an elevation view of the conveyor system of FIGS. 5–7.
Figure 9:
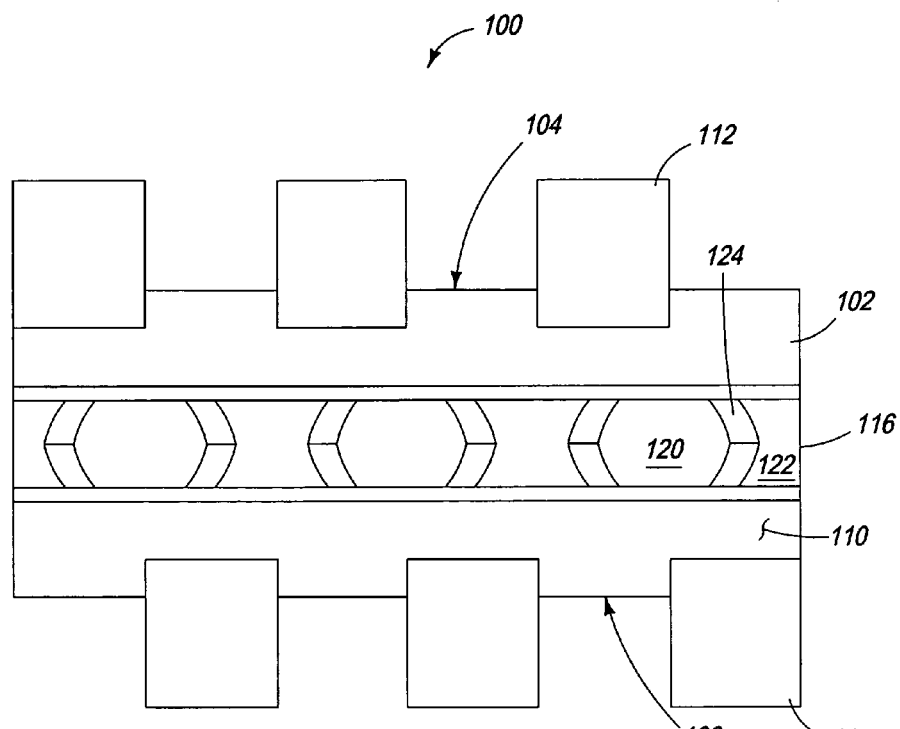
FIG. 9 is a plan view of a conveyor module in accordance with another preferred embodiment of the present invention.
Figure 10:
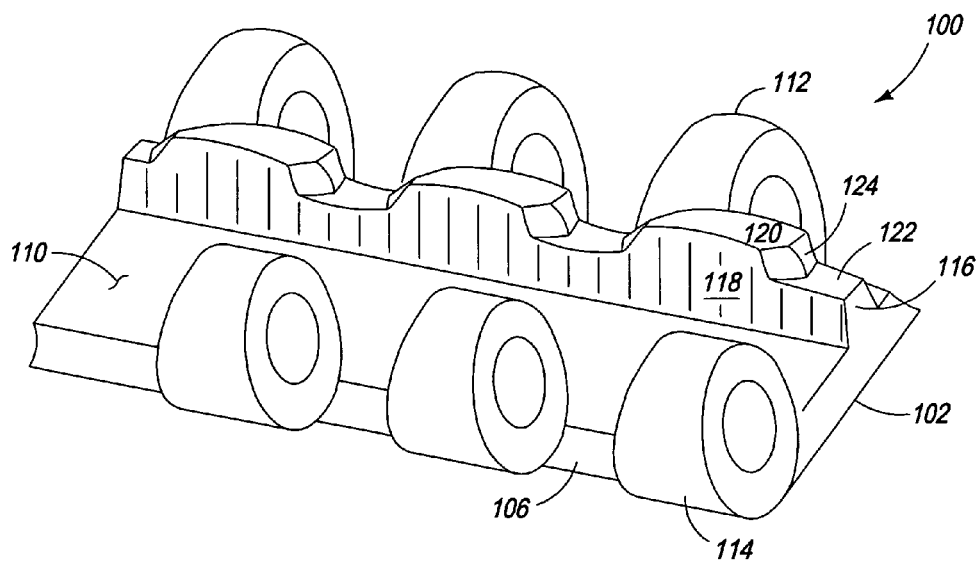
FIG. 10 is an isometric view of the conveyor module of FIG. 9.
Figure 12:
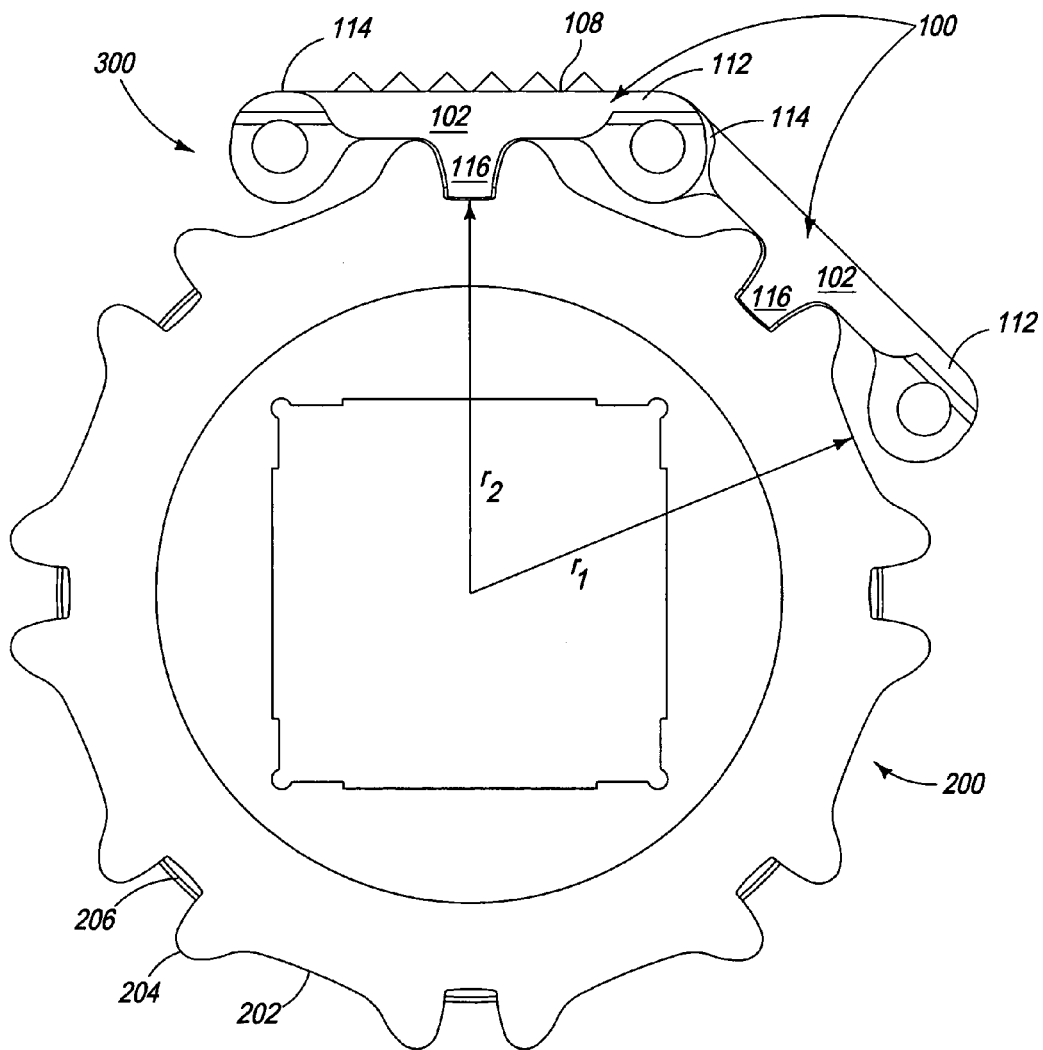
FIG. 12 is an elevation view of the conveyor system of FIGS. 9–11.

Referring to FIGS. 1, 2, 5, 6, 9, and 10 of the drawings, the reference numeral 100 generally designates a conveyor module. Conveyor module 100 comprises a planar member 102, which has a first edge 104, and a second edge 106, a top surface 108 (shown in FIGS. 4, 8, and 12) and a bottom surface 110. Along first edge 104 are first links 112, and along second edge 106 are second links 114, which are offset from first links 112. First links 112 and second links 114 form eyelets that are designed to engage and coaxially align with each other to form a continuous conveyor belt 300, as shown in FIGS. 4, 8, and 12.

Also shown in FIGS. 1, 2, 5, 6, 9, and 10 is drive bar 116. The bottom of drive bar 116 extends generally perpendicular from bottom surface 110 of planer member 102 and is substantially parallel to first edge 104 and second edge 106, and substantially centralized therebetween. Along each vertical side of drive bar 116 is a drive face 118. In a preferred embodiment, drive face 118 is at an angle inclined relative to planar member 102. Included within drive bar 116 are crest pairs 120 with troughs 122 therebetween, forming the top of drive bar 116. Connecting troughs 122 to crest pairs 120 are nonplanar shoulders 124.

In the preferred embodiment, shoulders 124 in trough 122 extend towards each other. In another preferred embodiment, opposing shoulders 124 converge at trough 122 such that distance between shoulders 124 at crest pairs 120 is greater than the distance between shoulders 124 at trough 122.

Figure 1:
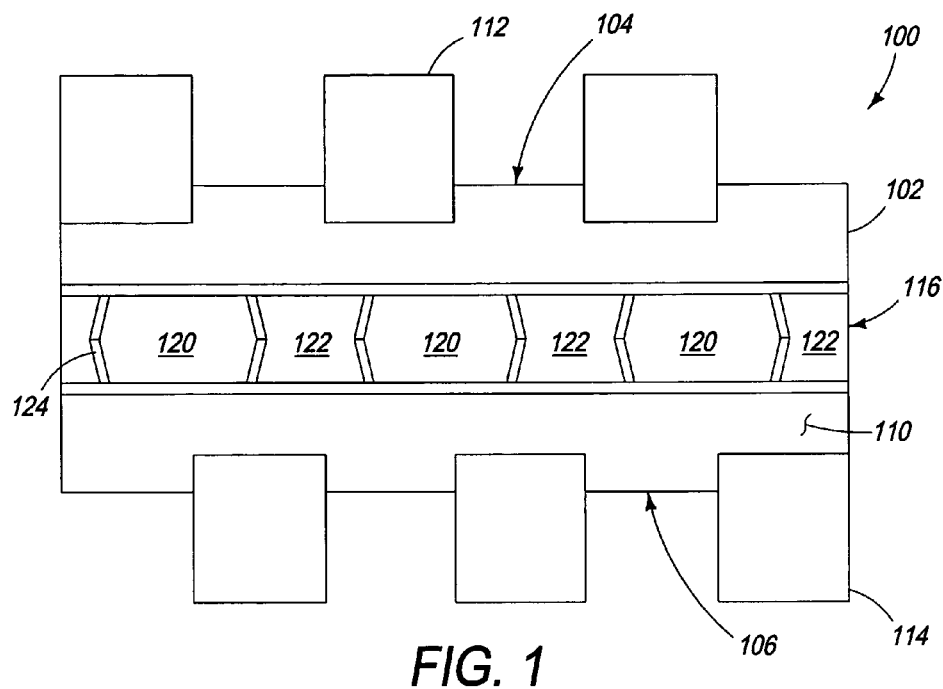
FIG. 1 is a plan view of a conveyor module in accordance with a preferred embodiment of the present invention.
Figure 2:
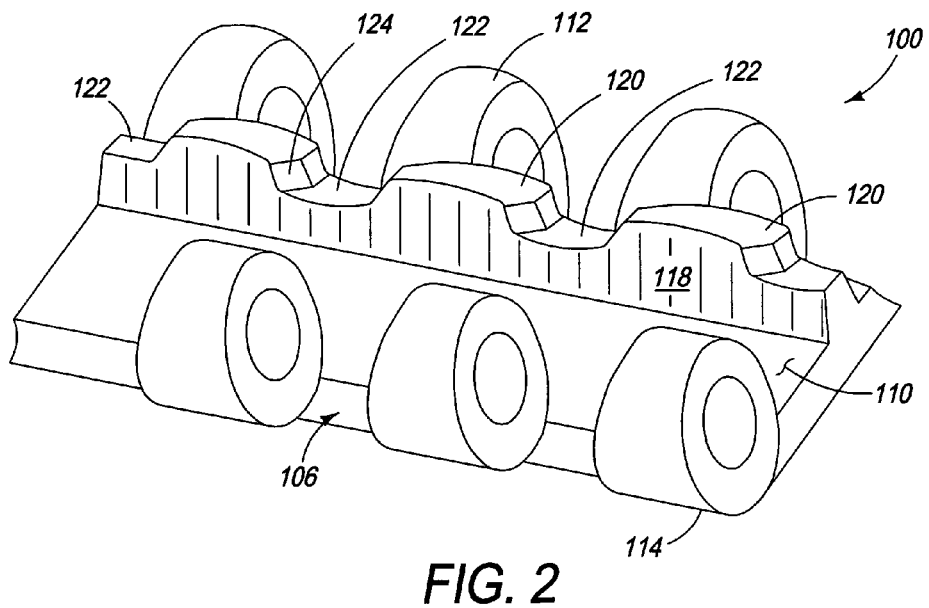
FIG. 2 is an isometric view of the conveyor module of FIG. 1.

In the preferred embodiment illustrated in FIGS. 1 and 2, nonplanar shoulders 124 are comprised of intersecting planes. In the preferred embodiment illustrated in FIGS. 5 and 6, nonplanar shoulders 124 are comprised of sections of a spheroid. In the preferred embodiment illustrated in FIGS. 9 and 10, nonplanar shoulders 124 are comprised of sections of a prolate spheroid.

Referring to FIGS. 3, 4, 7, 8, 11, and 12 of the drawings, the reference numeral 200 generally designates a sprocket. Sprocket 200 comprises generally semicircular recesses 202 located along the periphery. Specifically, the local minimums of semicircular recesses 202 or the point where the first derivative of the curves defining semicircular recesses 202 is zero are at a first radius $r_1$. At the ends of semicircular recesses 202 are driving members 204. Between driving members 204 of adjacent semicircular recesses 202 are tracking teeth 206, which are at a second radius $r_2$.

Figure 3:
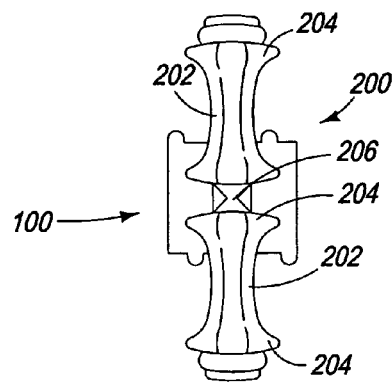
FIG. 3 is a plan view of a sprocket for use with the conveyor module of FIG. 1.
Figure 6:
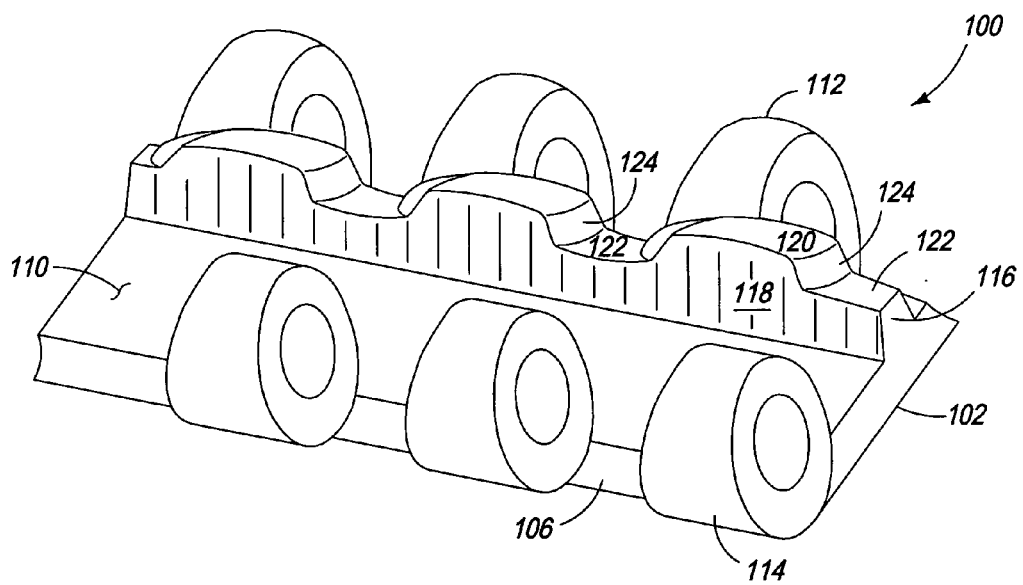
FIG. 6 is an isometric view of the conveyor module of FIG. 5.
Figure 7:
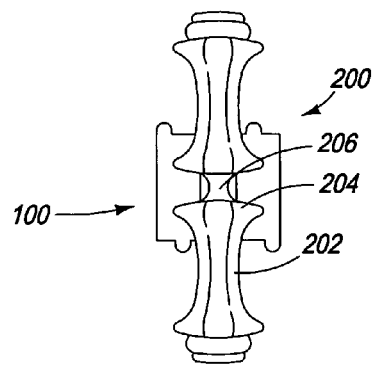
FIG. 7 is a plan view of a sprocket for use with the conveyor module of FIG. 5.
Figure 11:
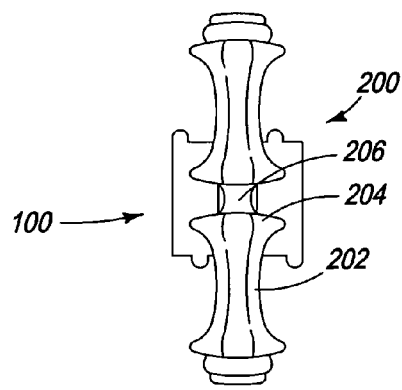
FIG. 11 is a plan view of a sprocket for use with the conveyor module of FIG. 9.

As can be seen in FIGS. 3, 4, 7, 8, 11, and 12, tracking teeth 206 can have different configurations. In FIGS. 3 and 4, tracking teeth 206 are shaped to form a complementary fit with nonplanar shoulders 124 of FIGS. 1 and 2. In FIGS. 7 and 8, tracking teeth 206 are shaped to form a complementary fit with nonplanar shoulders 124 of FIGS. 5 and 6. In FIGS. 11 and 12, tracking teeth 206 are shaped to form a complementary fit with nonplanar shoulders 124 of FIGS. 9 and 10.

Advantages of the present invention are that it is simple, safe, and durable. Another advantage of the present invention is that it is inexpensive to manufacture. Another advantage of the present invention is that it provides for a simplified, easily deployable, and easily removable system. Another advantage of the present invention is that it is easy to clean and provides improved tracking.

OPERATION OF THE PREFERRED EMBODIMENTS

In forming a conveyor system, several integral components are employed, namely sprocket 200 and conveyor belt 300. As can be seen in FIGS. 4, 8, and 12, sprocket 200 drives conveyor belt 300, while tracking conveyor belt 300 at the same time. Each of sprocket 200 and conveyor belt 300 can be formed of a variety of materials including, but not limited to, metal, plastic, and porcelain. In a preferred embodiment of the present invention, the sprocket 200 and conveyor belt 300 are formed of an injection molded polyvinyl chloride (PVC).

Conveyor belt 300 is comprised of multiple interlocking conveyor modules 100. Referring to FIGS. 1, 2, 5, 6, 9, and 10 of the drawings, conveyor module 100 is shown. There are a number of ways to configure conveyor module 100; however, there are some common features to each configuration. In particular, conveyor module 100 comprises a planar member 102, which has a first edge 104, a second edge 106, a top surface 108, and a bottom surface 110. Planar member 102 forms the central component from which the remainder of conveyor module 100 is built. Additionally, planar member 102 is responsible for carrying meat products when conveyor belt 300 is in operation.

Along first edge 104 of planar member 102 are first links 112, and along second edge 106 of planar member 102 are second links 114. First links 112 and second links 114 are designed to engage and coaxially align with each other to form conveyor belt 300. Specifically, first links 112 and second links 114 are cylindrical tubes, or eyelets that engage and coaxially align with one another to form a pivotal hinge over a pivot bar (not shown).

In FIGS. 1, 2, 5, 6, 9, and 10, drive bar 116 is illustrated. The function of drive bar 116 is two-fold: driving and tracking. Specifically, drive bar 116 extends perpendicular from bottom surface 110 of planer member 102 and is substantially parallel to first edge 104 and second edge 106. Along each vertical side of drive bar 116 is a drive face 118. At the juncture of drive face 118 between drive bar 116 and planar member 102 is a stress riser. Because drive bar 116 can extend along the entire length of planar member 102, stress can be more distributed to material along the length of the juncture, thus, reducing the incidence of fracture or mechanical breakdown.

In an alternative embodiment, drive face 118 can be inclined at an obtuse angle relative to bottom surface 110. Having this inclination allows for easier engagement of conveyor modules 100 with sprocket 200 and adds to the strength of drive bar 116. In a preferred embodiment, the angle of inclination between drive face 118 and bottom surface is between 100 and 120 degrees.

Also included within drive bar 116 are crest pairs 120 with troughs 122 therebetween. The combination of crest pairs 120 and troughs 122 provides tracking of conveyor belt 300. Specifically, tracking teeth 206 on sprocket 200 are cradled between the crest pairs 120 in troughs 122. However, troughs 122 and crest pairs 120 do not typically provide sufficient tracking. Oftentimes, there is considerable lateral play that can cause a conveyor belt to lose tracking and bind the conveyor system. However, use of narrow troughs 122 can result in system binding and failure. In the preferred embodiment of the present invention, nonplanar shoulders 124 are employed which connect troughs 122 to crest pairs 120.

In the preferred embodiment, shoulders 124 in trough 122 extend towards each other. This provides a converging configuration that guides tracking teeth 206 on sprocket 200 to the center of troughs 122. In another preferred embodiment, opposing shoulders 124 converge at trough 122 such that the distance between shoulders 124 at crest pairs 120 is greater than the distance between shoulders 124 at trough 122. This configuration ensures smooth operation of conveyor system 300 when tracking teeth 206 engage shoulders 124.

The alternative embodiments disclose differing geometries of nonplanar shoulders 124. In one preferred embodiment of the present invention, as shown in FIGS. 1 and 2, nonplanar shoulders 124 are comprised of two intersecting planes. In essence, a wedge or V-shape is formed. Typically, the line of intersection of the planes is at an incline to bottom surface 110 so that tracking teeth 206 can be more easily engaged. Thus, the intersecting planes of shoulder 124 provide smooth transitional alignment of conveyor modules 100 relative to sprocket 200 and prevent lateral misalignment.

Figure 5:
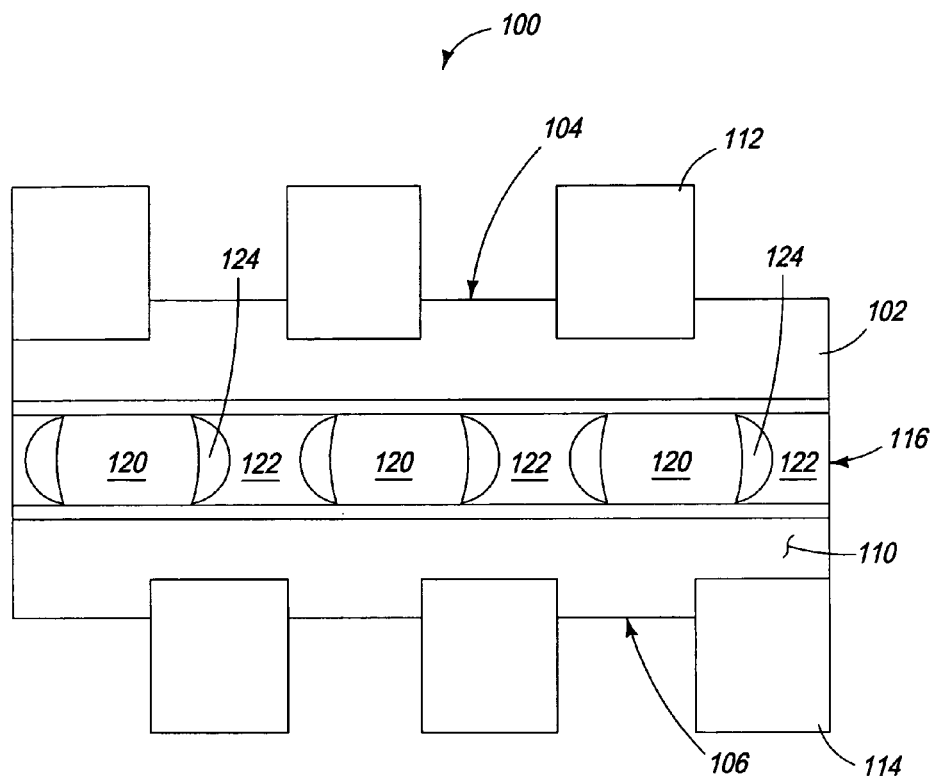
FIG. 5 is a plan view of a conveyor module in accordance with another preferred embodiment of the present invention.

In another preferred embodiment of the present invention, illustrated in FIGS. 5 and 6, nonplanar shoulders 124 are comprised of sections of a spheroid. In another preferred embodiment of the present invention, illustrated in FIGS. 9 and 10, nonplanar shoulders 124 are comprised of sections of a prolate spheroid. This geometry is commonly referred to as football-shaped.

Referring to FIGS. 3, 4, 7, 8, 11, and 12 of the drawings, sprocket 200 is shown. There are a number of ways to configure sprocket 200; however, there are some common features to each configuration. Sprocket 200 comprises generally semicircular recesses 202 located along the periphery. Specifically, the local minimums of generally semicircular recesses 202 or the point where the first derivative of the curves defining semicircular recesses 202 is zero are at a first radius $r_1$. Typically, first radius $r_1$ is from about 2.5 inches to about 4.75 inches.

At the ends of each of recesses 202 are driving members 204. Driving members 204 apply force to drive face 118 of drive bar 116 and contact bottom surface 110 of planar member 102. In the preferred embodiment, the height of driving members 204 is sufficient to prevent linking members 112 and 114 from contacting semicircular recesses 202, and to prevent tracking teeth 206 from contacting troughs 122. The pivot joint formed between first linking member 112 and second linking member 114 of adjacent conveyor modules 100 is notoriously difficult to clean and is an ideal location for bacterial colonies to grow. Preventing contact with recesses 202, and with troughs 122 prevents meat from being compressed between first links 112 and second links 114 and prevents meat from being compressed inside of either the first links 112 or second links 114. Thus, conveyor belt 300 is easier to clean.

Differences in the alternate embodiments can be seen with the differing geometries of tracking teeth 206, which correspond to the different geometries of nonplanar shoulders 124 discussed above. Between semicircular recesses 202 are tracking teeth 206, which are at a second radius $r_2$. Typically, second radius $r_2$ is from about 2.75 inches to about 5.0 inches. In one embodiment of the present invention, as shown in FIGS. 3 and 4, tracking teeth 206 are shaped to form a complementary fit with nonplanar shoulders 124 of FIGS. 1 and 2. In another embodiment of the present invention, as shown in FIGS. 7 and 8, tracking teeth 206 are shaped to form a complementary fit with nonplanar shoulders 124 of FIGS. 5 and 6. In yet another preferred embodiment of the present invention, as shown in FIGS. 11 and 12, tracking teeth 206 are shaped to form a complementary fit with nonplanar shoulders 124 of FIGS. 9 and 10.

Advantages of various embodiments of the present invention are that it is simple, safe, and durable. Another advantage of various embodiments of the present invention is that it is inexpensive to manufacture. Another advantage of various embodiments of the present invention is that it provides for a simplified, easily deployable, and easily removable system. Other advantages of various embodiments of the present invention are that it is easy to clean and provides improved tracking.

It will be readily apparent to those skilled in the art that the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim:

1. A conveyor belt, comprising:
   a plurality of conveyor modules pivotally secured to one another, wherein each conveyor module comprising:
      a planar member having a first edge, an opposing second edge, a top surface, and a bottom surface;
      a plurality of first links located along the first edge;
      a plurality of second links located along the second edge, and offset from the first links;
      a drive bar extending generally perpendicular from the center of the bottom surface and substantially parallel to the first and second edges; and,
      the drive bar comprising a pair of opposing drive faces and a pair of crests with a trough therebetween connected by a pair of shoulders; and
      wherein the crests, trough, and shoulders form the top of the drive bar.

2. The conveyor belt of claim 1, wherein the shoulders in a trough extend towards each other.

3. The conveyor belt of claim 1, wherein opposing shoulders converge at the trough such that distance between the shoulders at the crests is greater than the distance between the shoulders at the trough.

4. The conveyor belt of claim 1, wherein each shoulder further comprises a pair of intersecting planar members.

5. The conveyor belt of claim 1, wherein each shoulder further comprises a curvilinear surface.

6. The conveyor belt of claim 5, wherein the curvilinear surface is a spheroid section.

7. The conveyor belt of claim 5, wherein the curvilinear surface is a prolate spheroid section.

8. A conveyor system, comprising:
   a sprocket comprising:
      a plurality of recesses, each recess having a driving member at each end;
      a tracking tooth located between each recess member; and
   a conveyor belt formed of a plurality of interlocked conveyor modules pivotally secured to one another, wherein each conveyor module comprises:
      a planar member having a first edge, an opposing second edge, a top surface, and a bottom surface;
      a plurality of first links located along the first edge;
      a plurality of second links located along the second edge, and offset from the first links;
      a drive bar extending generally perpendicular from the center of the bottom surface and substantially parallel to the first and second edges;
      the drive bar comprising a pair of opposing drive faces and a pair of crests with a trough therebetween connected by a pair of shoulders; and
      wherein the crests, trough, and shoulders form the top of the drive bar.

9. The conveyor system of claim 8, wherein each tracking tooth is adapted to form a complementary fit with the shoulders.

10. The conveyor belt of claim 8, wherein the shoulders in a trough extend towards each other.

11. The conveyor belt of claim 8, wherein opposing shoulders converge at the trough such that distance between the shoulders at the crests is greater than the distance between the shoulders at the trough.

12. The conveyor belt of claim 8, wherein each shoulder further comprises a pair of intersecting planar members.

13. The conveyor belt of claim 8, wherein each shoulder further comprises a curvilinear surface.

14. The conveyor belt of claim 13, wherein the curvilinear surface is a spheroid section.

15. The conveyor belt of claim 13, wherein the curvilinear surface is a prolate spheroid section.

* * * * *